(12) United States Patent
Su et al.

(10) Patent No.: US 12,068,680 B2
(45) Date of Patent: Aug. 20, 2024

(54) HIGHLY INTEGRATED POWER MODULE AND ELECTRICAL APPLIANCE

(71) Applicants: GD MIDEA AIR-CONDITIONING EQUIPMENT CO., LTD., Guangdong (CN); MIDEA GROUP CO., LTD., Guangdong (CN)

(72) Inventors: Yuquan Su, Guangdong (CN); Yuxiang Feng, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 382 days.

(21) Appl. No.: 17/357,113

(22) Filed: Jun. 24, 2021

(65) Prior Publication Data

US 2021/0320585 A1 Oct. 14, 2021

Related U.S. Application Data

(63) Continuation of application No. PCT/CN2019/084098, filed on Apr. 24, 2019.

(30) Foreign Application Priority Data

Dec. 29, 2018 (CN) .......................... 201811640661.5
Dec. 29, 2018 (CN) .......................... 201822274207.4
(Continued)

(51) Int. Cl.
*H02M 1/42* (2007.01)
*F24F 11/08* (2006.01)
*H02P 27/06* (2006.01)

(52) U.S. Cl.
CPC .............. *H02M 1/42* (2013.01); *F24F 11/08* (2013.01); *H02P 27/06* (2013.01)

(58) Field of Classification Search
CPC .... H02M 7/537; H02M 7/122; H02M 1/4225; H02M 1/08; H02M 1/084; H02M 1/32;
(Continued)

(56) References Cited

U.S. PATENT DOCUMENTS 10,122,293 B2 * 11/2018 Chen ................... H02M 1/4225
10,438,876 B2 * 10/2019 Fernando .......... H01L 23/49548
(Continued)

FOREIGN PATENT DOCUMENTS

CN         2511909 Y     9/2002
CN         2596657 Y    12/2003
(Continued)

OTHER PUBLICATIONS

Notice of Reasons for Refusal dated Jun. 21, 2022 received in Japanese Patent Application No. JP 2021-536717.
(Continued)

*Primary Examiner* — Thienvu V Tran
*Assistant Examiner* — Nusrat Quddus
(74) *Attorney, Agent, or Firm* — Scully, Scott, Murphy & Presser, P.C.

(57) ABSTRACT

A highly integrated power module and an air conditioner are provided. The module has a substrate. The module has a power factor correction element, a rectifier bridge, a compressor inverter and a blower inverter, which are arranged on the substrate. The rectifier bridge is arranged on a first side of the power factor correction element. The compressor inverter is arranged on a second side of the power factor correction element. The blower inverter is arranged on a third side of the compressor inverter. The rectifier bridge is electrically connected to the power factor correction element. The power factor correction element is electrically connected to the compressor inverter and the blower inverter.

12 Claims, 7 Drawing Sheets

(30) Foreign Application Priority Data

| Dec. 29, 2018 | (CN) | 201822277632.9 |
| Dec. 29, 2018 | (CN) | 201822277634.8 |
| Dec. 29, 2018 | (CN) | 201822277636.7 |

(58) Field of Classification Search
CPC .......... H02M 1/34; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02H 7/122; H02H 9/00; H02H 9/005; H02H 9/04; H02H 9/042; H02H 9/045; H02H 9/041

See application file for complete search history.

(56) References Cited

U.S. PATENT DOCUMENTS

| 11,439,303 | B2 * | 9/2022 | Kontiola | A61B 8/10 |
| 2018/0019695 | A1 | 1/2018 | Hasegawa et al. | |
| 2018/0047714 | A1 * | 2/2018 | Feng | H05K 1/111 |
| 2019/0335628 | A1 * | 10/2019 | Lei | H01L 23/473 |
| 2020/0146174 | A1 * | 5/2020 | Song | H02M 7/003 |

FOREIGN PATENT DOCUMENTS

| CN | 202111629 | U | | 1/2012 |
| CN | 104795374 | A | | 7/2015 |
| CN | 204481692 | U | | 7/2015 |
| CN | 204538457 | U | | 8/2015 |
| CN | 104766842 | B | | 9/2017 |
| CN | 104835794 | B | | 2/2018 |
| CN | 208238066 | | * | 12/2018 |
| CN | 208240659 | | * | 12/2018 |
| CN | 208241588 | | * | 12/2018 |
| CN | 208257677 | | * | 12/2018 |
| CN | 208257678 | | * | 12/2018 |
| CN | 208296199 | | * | 12/2018 |
| CN | 208316603 | | * | 1/2019 |
| CN | 109510561 | A | | 3/2019 |
| CN | 209184524 | U | | 7/2019 |
| JP | H02-194594 | A | | 8/1990 |
| JP | 2009110981 | A | | 5/2009 |
| JP | 2009176763 | A | | 8/2009 |
| JP | 2013115410 | A | | 6/2013 |
| JP | 2018509780 | A | | 4/2018 |
| WO | 2018211580 | A1 | | 11/2018 |

OTHER PUBLICATIONS

International Search Report dated Jul. 9, 2021 received in International Application No. PCT/CN2019/084098 together with an English language translation.

First Office Action dated Dec. 1, 2023 received in Chinese Patent Application No. CN 201811640661.5.

* cited by examiner

HIGHLY INTEGRATED POWER MODULE AND ELECTRICAL APPLIANCE

CROSS-REFERENCE TO RELATED APPLICATIONS

The present application is a continuation application of PCT International Application No. PCT/CN2019/084098, filed on Apr. 24, 2019, which claims priority to and benefits of Chinese Patent Application Nos. 201811640661.5, 201822274207.4, 201822277634.8, 201822277636.7 and 201822277632.9, all filed on Dec. 29, 2018, the entire contents of which are incorporated herein by reference for all purposes. No new matter has been introduced.

FIELD

This application relates to the field of electrical appliances, and more particularly to a highly integrated power module and an electrical appliance.

BACKGROUND

At present, power devices for electronic control over air conditioners mainly include rectifier bridges, power factor correction (PFC) elements, compressor intelligent power modules (IPM) and blower IPMs. In traditional electronic control, these power devices are discretely distributed in different regions and far apart from each other, and occupy a large area, resulting in a large heat dissipation area and high cost.

Thus, the current arrangement of power devices still needs to be improved.

SUMMARY

The present disclosure aims to solve at least one of the technical problems existing in the related art. To this end, an objective of the present disclosure is to propose a highly integrated power module that integrates a power factor correction component, a rectifier bridge, a compressor inverter, and a blower inverter on a common substrate, which can effectively reduce an area occupied by the above-mentioned power devices, bring a good heat dissipation effect, and uniformly control the reliability of the above-mentioned power devices. Moreover, the highly integrated power module is easy to repair, or is conducive to addressing the problem of circuit optimization.

In one aspect, the present disclosure provides a highly integrated power module. According to embodiments of the present disclosure, the highly integrated power module includes: a substrate; and a power factor correction element, a rectifier bridge, a compressor inverter and a blower inverter arranged on the substrate. The rectifier bridge is arranged on a first side of the power factor correction element, the compressor inverter is arranged on a second side of the power factor correction element, and the blower inverter is arranged on a third side of the compressor inverter. The rectifier bridge is electrically connected to the power factor correction element, and the power factor correction element is electrically connected to the compressor inverter and the blower inverter. The PFC with the highest temperature is in a middle position, and its heat can be effectively diffused through both sides, which is beneficial to improving the heat dissipation efficiency of the highly integrated power module. The above-mentioned power devices are distributed compactly, with a high level of integration, and occupy a relatively small area without affecting heat dissipation. The space can be fully utilized, and the reliability of the power devices can be controlled uniformly. The highly integrated power module is easy to develop and maintain. Moreover, since the arrangement of the power devices is consistent with a current flow direction, the circuit wiring can be simplified, and the cost of the highly integrated power module can be reduced considerably.

According to an embodiment of the present disclosure, the highly integrated power module includes: a substrate; and a power factor correction element, a rectifier bridge, a compressor inverter and a blower inverter arranged on the substrate, in which the rectifier bridge is arranged on a left side of the power factor correction element, the compressor inverter is arranged on a right side of the power factor correction element, and the blower inverter is arranged on a right side of the compressor inverter; the rectifier bridge is electrically connected to the power factor correction element, and the power factor correction element is electrically connected to the compressor inverter and the blower inverter.

According to an embodiment of the present disclosure, the rectifier bridge is arranged on a left side of the power factor correction element, the compressor inverter is arranged on an upper side of the power factor correction element, and the blower inverter is arranged on a lower side of the compressor inverter.

According to an embodiment of the present disclosure, the rectifier bridge is arranged on an upper side of the power factor correction element, the compressor inverter is arranged on a lower side of the power factor correction element, and the blower inverter is arranged on a lower side of the compressor inverter.

According to an embodiment of the present disclosure, the rectifier bridge is arranged on a left side of the power factor correction element, the compressor inverter is arranged on a right side of the power factor correction element, and the blower inverter is arranged on a left side of the compressor inverter.

According to an embodiment of the present disclosure, the compressor inverter includes a first device unit and a first control unit spaced apart from each other, and the first control unit is arranged on a right side of the first device unit.

According to an embodiment of the present disclosure, the compressor inverter includes a first device unit and a first control unit spaced apart from each other, and the first control unit is arranged on a lower side of the first device unit.

According to an embodiment of the present disclosure, the first device unit includes six IGBT modules, and each of the IGBT modules includes one insulated gate bipolar transistor and one fast recovery diode, in which at least one of the IGBT modules is arranged horizontally, and at least a part of the horizontally arranged IGBT module is arranged between two sub-elements of the power factor correction element.

According to an embodiment of the present disclosure, one of the IGBT modules is arranged horizontally, and at least a part of the fast recovery diode in the horizontally arranged IGBT module is arranged between the two sub-elements of the power factor correction element; five of the IGBT modules are vertically arranged, and the fast recovery diode is located above the insulated gate bipolar transistor in each of the vertically arranged IGBT modules.

According to an embodiment of the present disclosure, the insulated gate bipolar transistor in the horizontally arranged IGBT module is located on a right side of the fast recovery diode in the horizontally arranged IGBT module.

According to an embodiment of the present disclosure, the compressor inverter includes a first device unit and a first control unit spaced apart from each other, and the first device unit includes a first horizontal section and a second horizontal section connected to each other, in which the first horizontal section is arranged on the upper side of the power factor correction element, and at least a part of the second horizontal section is arranged on a right side of the power factor correction element.

According to an embodiment of the present disclosure, the first control unit is arranged on an upper side of the second horizontal section and located on a horizontal side of at least a part of the first horizontal section.

According to an embodiment of the present disclosure, each of the first horizontal section and the second horizontal section includes three IGBT modules arranged vertically, and each of the IGBT modules includes one insulated gate bipolar transistor and one fast recovery diode. In each of the IGBT modules of the first horizontal section, the fast recovery diode is located on an upper side of the insulated gate bipolar transistor; and in each of the IGBT modules of the second horizontal section, the fast recovery diode is located on a lower side of the insulated gate bipolar transistor.

According to an embodiment of the present disclosure, the compressor inverter includes a first device unit and a first control unit spaced apart from each other, and the first control unit is arranged on a lower side of the first device unit.

According to an embodiment of the present disclosure, the first device unit includes six IGBT modules, and each of the IGBT modules includes one insulated gate bipolar transistor and one fast recovery diode. At least one of the IGBT modules is arranged vertically, and at least a part of the vertically arranged IGBT module is arranged between two sub-elements of the power factor correction element.

According to an embodiment of the present disclosure, four of the IGBT modules are vertically arranged, and the insulated gate bipolar transistor is located on a lower side of the fast recovery diode in each of the vertically arranged IGBT modules, and in which in one of the vertically arranged IGBT modules, at least a part of the fast recovery diode is arranged between the two sub-elements in the power factor correction element; two of the IGBT modules are arranged horizontally, and the fast recovery diode is located on a right side of the insulated gate bipolar transistor in each of the horizontally arranged IGBT modules.

According to an embodiment of the present disclosure, the blower inverter includes a second device unit and a second control unit; the second device unit includes six reverse-conducting insulated gate bipolar transistors; a part of the six reverse-conducting insulated gate bipolar transistors are linearly spaced apart from one another along a horizontal direction to form a horizontal section; another part of the reverse-conducting insulated gate bipolar transistors are linearly spaced apart from one another along a vertical direction to form a vertical section; the vertical section is arranged above the horizontal section, in which the second control unit is arranged above the horizontal section and located on a horizontal side of at least a part of the vertical section.

According to an embodiment of the present disclosure, the first control unit is arranged on a horizontal side of at least a part of the vertical section and located on a left side of the second control unit.

According to an embodiment of the present disclosure, the first control unit and the second control unit are located on a same side of the vertical section.

According to an embodiment of the present disclosure, the blower inverter includes a second device unit and a second control unit; the second device unit includes six reverse-conducting insulated gate bipolar transistors; a part of the six reverse-conducting insulated gate bipolar transistors are linearly spaced apart from one another along a horizontal direction to form a third horizontal section; another part of the reverse-conducting insulated gate bipolar transistors are linearly spaced apart from one another along a vertical direction to form a vertical section; the vertical section is arranged on an upper side of the third horizontal section, in which the second control unit is arranged on a horizontal side of at least a part of the vertical section.

According to an embodiment of the present disclosure, the second control unit is arranged on a right side of the vertical section.

According to an embodiment of the present disclosure, the first control unit is arranged on the upper side of the second horizontal section and located on a right side of the first horizontal section.

According to an embodiment of the present disclosure, the blower inverter includes a second device unit and a second control unit; the second device unit includes six reverse-conducting insulated gate bipolar transistors; a part of the six reverse-conducting insulated gate bipolar transistors are linearly spaced apart from one another along a horizontal direction to form a horizontal section; another part of the reverse-conducting insulated gate bipolar transistors are linearly spaced apart from one another along a vertical direction to form a vertical section; the vertical section is arranged on an upper side of the horizontal section, in which the second control unit is arranged on the upper side of the horizontal section and located on a horizontal side of at least a part of the vertical section.

According to an embodiment of the present disclosure, the first control unit is arranged on a horizontal side of at least a part of the vertical section and located on an upper side of the second control unit.

According to an embodiment of the present disclosure, the first control unit and the second control unit are located on a same side of the vertical section.

According to an embodiment of the present disclosure, the blower inverter includes a second device unit and a second control unit; the second device unit includes six reverse-conducting insulated gate bipolar transistors; a part of the six reverse-conducting insulated gate bipolar transistors are linearly spaced apart from one another along a horizontal direction to form a horizontal section; another part of the reverse-conducting insulated gate bipolar transistors are linearly spaced apart from one another along a vertical direction to form a vertical section; the vertical section is arranged on a right side of the horizontal section, in which the second control unit is arranged on a left side of the vertical section and located on a vertical side of at least a part of the third horizontal section.

According to an embodiment of the present disclosure, the second control unit is arranged right above at least a part of the horizontal section.

According to an embodiment of the present disclosure, the second control unit is arranged right below at least a part of the horizontal section and right on a left side of at least a part of the vertical section.

According to an embodiment of the present disclosure, the highly integrated power module further includes: high-voltage pins arranged on a first edge of the substrate, and electrically connected to an input terminal of the rectifier bridge, an output terminal of the rectifier bridge, an output terminal of the power factor correction element, a collector and an emitter of the insulated gate bipolar transistor of the compressor inverter, and a collector and an emitter of the reverse-conducting insulated gate bipolar transistor of the blower inverter; and low-voltage pins arranged on a second edge of the substrate, and electrically connected to the first control unit and the second control unit.

According to an embodiment of the present disclosure, the highly integrated power module further includes: at least one type of connecting wires, resistor elements, and capacitor elements, in which the connecting wires, the resistor elements, and the capacitor elements are arranged in a vacant region on the substrate.

In another aspect, the present disclosure provides an electrical appliance. According to embodiments of the present disclosure, the electrical appliance includes the aforementioned highly integrated power module. The electrical appliance has a better heat dissipation effect, longer service life, better performance over a long period of use, and lower cost.

DETAILED DESCRIPTION OF EMBODIMENTS

Embodiments of the present disclosure will be described in detail below. The embodiments described below are exemplary and are intended to explain the present disclosure rather than limit the present disclosure. Where specific techniques or conditions are not indicated in the embodiments, reference can be made to the techniques or conditions described in literature of the art or in product specifications.

In one aspect, the present disclosure provides a highly integrated power module. According to embodiments of the present disclosure, the highly integrated power module includes: a substrate; and a power factor correction (PFC) element, a rectifier bridge, a compressor inverter, and a blower inverter arranged on the substrate. The rectifier bridge is arranged on a first side of the power factor correction element, the compressor inverter is arranged on a second side of the power factor correction element, and the blower inverter is arranged on a third side of the compressor inverter. The rectifier bridge is electrically connected to the power factor correction element, and the power factor correction element is electrically connected to the compressor inverter and the blower inverter. The PFC with the highest temperature is in a middle position, and its heat can be effectively diffused through both sides, which is beneficial to improving the heat dissipation efficiency of the highly integrated power module. The above-mentioned power devices are distributed compactly, with a high level of integration, and occupy a relatively small area without affecting heat dissipation. The space can be fully utilized, and the reliability of the power devices can be controlled uniformly. The highly integrated power module is easy to develop and maintain. Moreover, since the arrangement of the power devices is consistent with a current flow direction, the circuit wiring can be simplified, and a flow path of the current from one power device to another power device can be shortened, resulting in less heat, avoiding too high temperature in the integrated power module, and greatly reducing the cost of the highly integrated power module.

Figure 1:
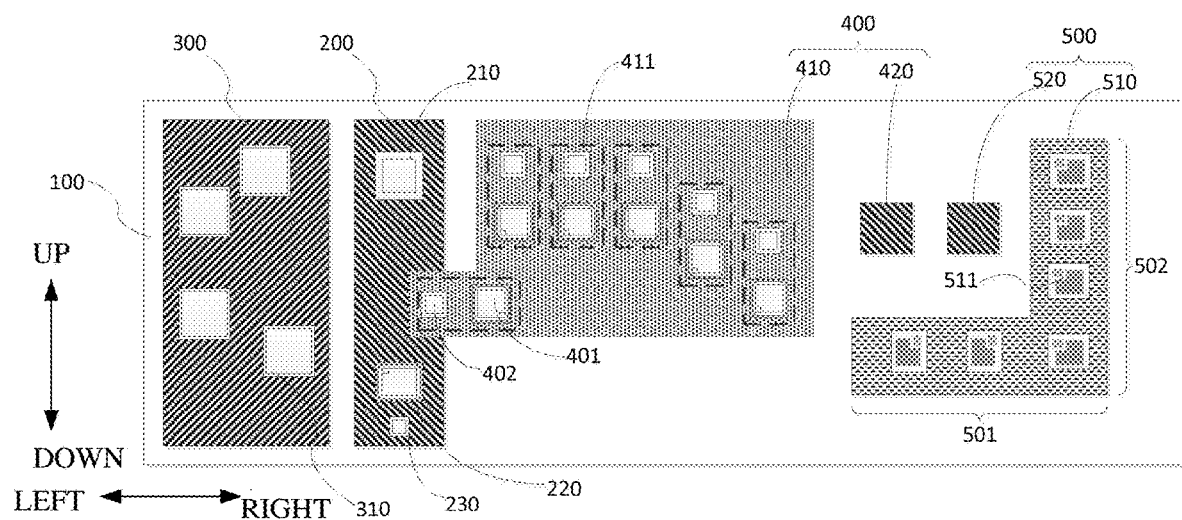
FIG. 1 is a schematic structural diagram of a highly integrated power module in an embodiment of the present disclosure.

According to some embodiments of the present disclosure, referring to FIG. 1, the highly integrated power module includes: a substrate 100; a power factor correction element 200, a rectifier bridge 300, a compressor inverter 400, and a blower inverter 500 arranged on the substrate 100. In the shown embodiment, the rectifier bridge 300 is arranged on a left side of the power factor correction element 200, the compressor inverter 400 is arranged on a right side of the power factor correction element 200, and the blower inverter 500 is arranged on a right side of the compressor inverter 400. The rectifier bridge 300 is electrically connected to the power factor correction element 200, and the power factor correction element 200 is electrically connected to the compressor inverter 400 and the blower inverter 500.

Figure 2:
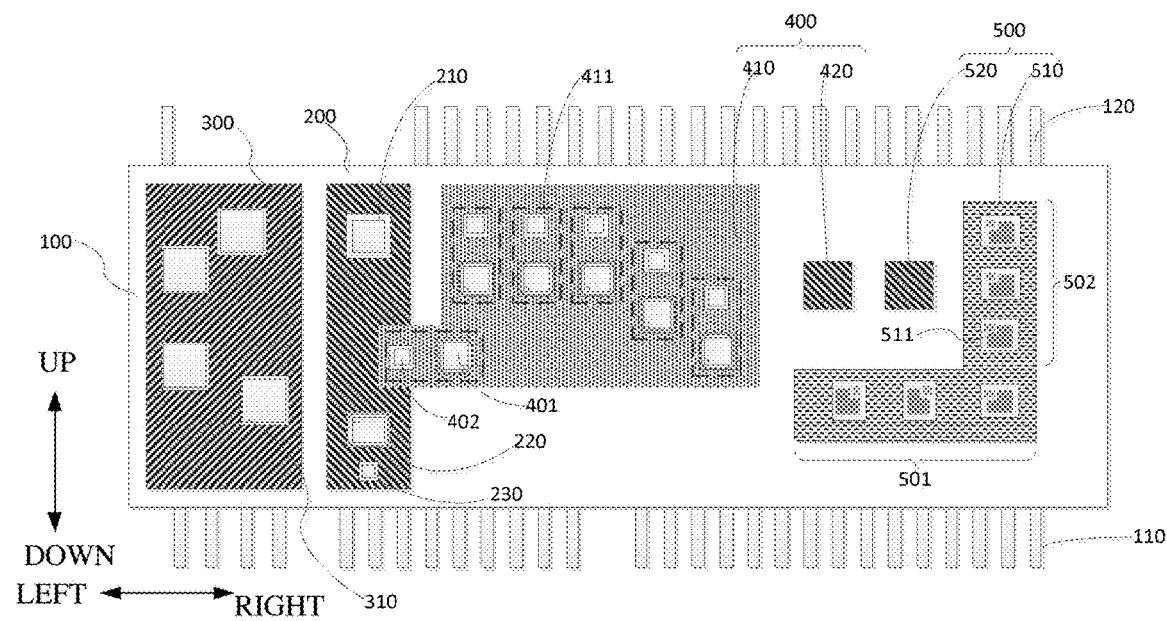
FIG. 2 is a schematic structural diagram showing additional elements of the highly integrated power module shown in FIG. 1.

Referring to FIG. 2, the highly integrated power module can further include: high-voltage pins 110 arranged on a lower edge of the substrate 100, and electrically connected to an input terminal of the rectifier bridge 300, an output terminal of the rectifier bridge 300, an output terminal of the power factor correction element 200, the compressor inverter 400 and the blower inverter 500; and low-voltage pins 120 arranged on an upper edge of the substrate, and electrically connected to the compressor inverter 400 and the blower inverter 500. Therefore, the above-mentioned power devices can be effectively driven, and signals generated in the power devices can be transmitted effectively in time, so that the highly integrated power module can operate efficiently.

According to an embodiment of the present disclosure, if the power factor correction element is arranged on an edge of the highly integrated power module, the heat generated by it can only be diffused in one direction, which may cause low heat dissipation efficiency, poor reliability, and a short service life.

As shown in FIG. 1, the compressor inverter 400 can include a first device unit 410 and a first control unit 420 spaced apart from each other. The first control unit 420 is arranged on a right side of the first device unit 410, and the first control unit 420 is electrically connected to the low-voltage pin 120. As a result, the current flowing through the first device unit is relatively small. The arrangement of the compressor inverter on the right side of the power factor correction element can facilitate heat dissipation. Moreover, the first control unit is arranged on a side of the first device unit away from the PFC, which can reduce the influence of the PFC with the high temperature on the first control unit, prolong the service life of the first control unit, and keep a good effect of controlling the first device unit during a long period of use. According to the embodiment of the present disclosure, the low-voltage pin may be electrically connected to an IC power supply, a ground wire, a gate control terminal, and a fault output terminal of an insulated gate bipolar transistor in the first control unit.

As shown in FIG. 1, the first device unit 410 can include six IGBT modules 411, and each of the IGBT modules 411 includes one insulated gate bipolar transistor 401 and one fast recovery diode 402. At least one of the IGBT modules 411 is arranged horizontally, and at least a part of the horizontally arranged IGBT module 411 is arranged between two sub-elements (e.g., a diode 210 and an insulated gate bipolar transistor 220) of the power factor correction element 200. A collector and an emitter of the insulated gate bipolar transistor 401 are electrically connected to the high-voltage pins 110. As a result, the arrangement of the first device unit and the PFC is more compact, thereby making the arrangement of various power devices in the highly integrated power module more compact, bringing about higher integration level, higher space utilization rate, and reducing the area occupied by the highly integrated power module without affecting the heat dissipation. Moreover, it is easier to uniformly control the reliability of the power devices, and the cost is lower.

As shown in FIG. 1, one of the IGBT modules 411 is arranged horizontally, at least a part of the fast recovery diode 402 in the horizontally arranged IGBT module 411 is arranged between the two sub-elements of the power factor correction element 200, and the insulated gate bipolar transistor 401 in the horizontally arranged IGBT module 411 is located on a right side of the fast recovery diode 402 in the horizontally arranged IGBT module 411. Five of the IGBT modules 411 are vertically arranged, and the fast recovery diode 402 is located on an upper side (or above) of the insulated gate bipolar transistor 401 in each vertically arranged IGBT module 411. Therefore, the combined use of the insulated gate bipolar transistor and the fast recovery diode can effectively reduce loss of state switch, and the arrangement of at least a part of the fast recovery diode between the two sub-elements of the power factor correction element is conductive to more compact arrangement of various power devices in the highly integrated power module, bringing about higher integration level, higher space utilization rate, and reducing the area occupied by the highly integrated power module without affecting the heat dissipation. Moreover, it is easier to uniformly control the reliability of the power devices, and the cost is lower.

It should be noted that the term "vertically arranged" mean that the insulated gate bipolar transistor 401 and the fast recovery diode 402 in the IGBT module 411 are arranged vertically in an up-down direction, and the term "horizontally arranged" mean that the insulated gate bipolar transistor 401 and the fast recovery diode 402 in the IGBT module 411 are arranged horizontally in a left-right direction.

According to the embodiments of the present disclosure, the type of the "two sub-elements" in "at least a part of the fast recovery diode 402 in the horizontally arranged IGBT module 411 being arranged between the two sub-elements of the power factor correction element 200" is not specifically limited. Referring to FIG. 1, at least a part of the fast recovery diode 402 in the horizontally arranged IGBT module 411 may be arranged between the diode 210 and the insulated gate bipolar transistor 220 of the power factor correction element 200, or may be arranged between the insulated gate bipolar transistor 220 and a fast recovery diode 230 of the power factor correction element 200. It should be noted that the location of the fast recovery diode 402 in the horizontally arranged IGBT module 411 in FIG. 1 is merely used to illustrate the present disclosure, and cannot be understood as limiting the present disclosure.

According to an embodiment of the present disclosure, referring to FIG. 1, the blower inverter 500 includes a second device unit 510 and a second control unit 520. The second device unit 510 includes six reverse-conducting insulated gate bipolar transistors 511. A part of the six reverse-conducting insulated gate bipolar transistors 511 are linearly spaced apart from one another along a horizontal direction to form a third horizontal section 501; another part of the reverse-conducting insulated gate bipolar transistors 511 are linearly spaced apart from one another along a vertical direction to form a vertical section 502. The vertical section 502 is arranged above the third horizontal section 501. The second control unit 520 is arranged above the horizontal section 501 and located on a horizontal side of at least a part of the vertical section 502. A collector and an emitter of each reverse-conducting insulated gate bipolar transistor 511 are electrically connected to the high-voltage pins 110, and the second control unit 520 is electrically connected to the low-voltage pin 120. Therefore, the structural arrangement of the blower inverter can make full use of space and improve the integration level of the highly integrated power module, and moreover, the heat generated by the power factor correction element has less influence on the second control unit, which can ensure high reliability of the power device. It should be noted that the horizontal direction refers to a direction parallel to the left-right direction, and the vertical direction refers to a direction parallel to the up-down direction. According to the embodiment of the present disclosure, the low-voltage pin may be electrically connected to an IC power supply, a ground wire, a gate control terminal and a fault output terminal of the reverse-conducting insulated gate bipolar transistor in the second control unit.

as shown in FIG. 1, the first control unit 420 can be arranged on a horizontal side of at least a part of the vertical section 502 and located on a left side of the second control unit 520. Therefore, the high temperature of the PFC has little effect on the first control unit and the second control unit, which is beneficial to prolonging the service life of the first control unit and the second control unit and allows them to maintain high operation efficiency during a long period of use. Moreover, the arrangement of the first control unit on the left side of the second control unit can simplify circuit wiring.

According to the embodiment of the present disclosure, the first control unit 420 and the second control unit 520 can be located on a same side of the vertical section 502. As a result, it is more conducive to improving the space utilization rate, and enhancing the integration level of the highly integrated power module. In some embodiments of the present disclosure, the first control unit and the second control unit are both arranged on a left side of the vertical section, realizing a better space-saving effect and a higher integration level of the highly integrated power module, and minimizing the effect of the high temperature of the PFC on the first control unit and the second control unit.

As shown in FIG. 2, by means of the rectifier bridge 300, part of the current is output to a peripheral circuit (such as a switching power supply) through a pin, and another part of the current flows to the power factor correction element 200. Then, by means of the power factor correction element 200, part of the current flows to the IGBT module 411 in the first device unit 410, and another part of the current flows to the reverse-conducting insulated gate bipolar transistor 511 in the second device unit 510. Therefore, the current flows from left to right, which is consistent with the arrangement direction of the power devices, and hence is beneficial to simplification of circuit wiring.

Figure 3:
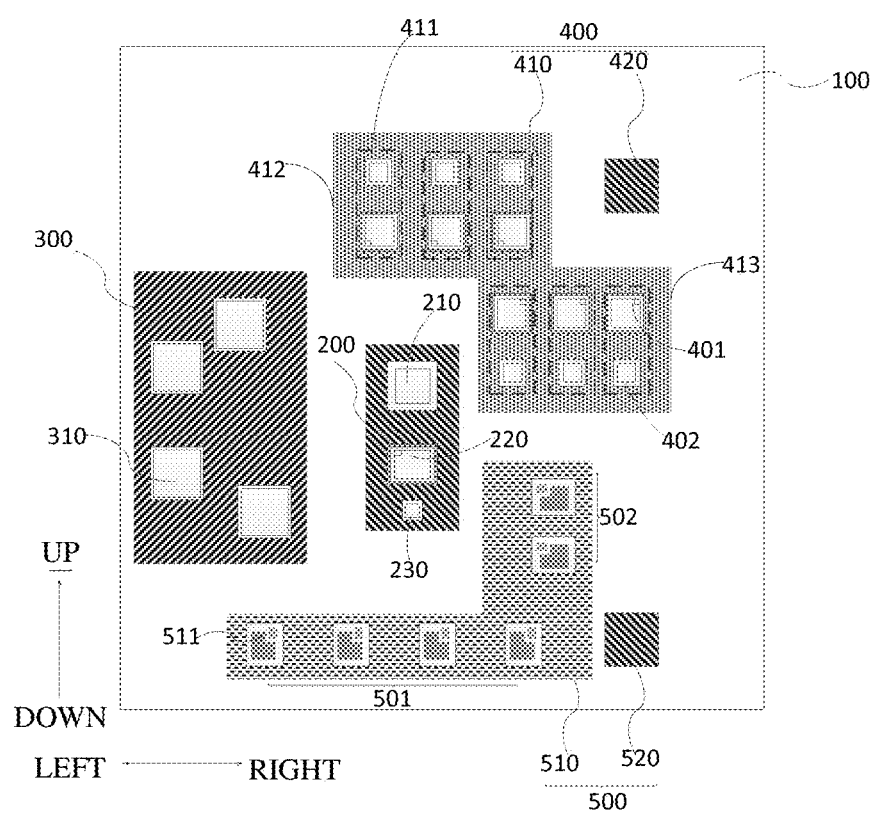
FIG. 3 is a schematic structural diagram of a highly integrated power module in another embodiment of the present disclosure.

FIG. 3 shows a highly integrated power module according to another embodiment of the present disclosure. The highly integrated power module includes: a substrate 100; a power factor correction element 200, a rectifier bridge 300, a compressor inverter 400 and a blower inverter 500 arranged on the substrate 100. The rectifier bridge 300 is arranged on a left side of the power factor correction element 200, the compressor inverter 400 is arranged on an upper side of the power factor correction element 200, and the blower inverter 500 is arranged on a lower side of the power factor correction element 200. The rectifier bridge 300 is electrically connected to the power factor correction element 200, and the power factor correction element 200 is electrically connected to the compressor inverter 400 and the blower inverter 500.

As shown in FIG. 3, the compressor inverter 400 can include a first device unit 410 and a first control unit 420 spaced apart from each other. The first device unit 410 includes a first horizontal section 412 and a second horizontal section 413 connected to each other. The first horizontal section 412 is arranged on the upper side of the power factor correction element 200, and at least a part of the second horizontal section 413 is arranged on a right side of the power factor correction element 200. As a result, the structure of the compressor inverter is conducive to making full use of space, reducing an area occupied by the highly integrated power module, and improving the integration level of the highly integrated power module, which can in turn allow uniform control over the reliability of the power devices and reduce development and maintenance difficulties.

As shown in FIG. 3, each of the first horizontal section 412 and the second horizontal section 413 can include three IGBT modules 411 arranged vertically, and each of the IGBT modules 411 includes one insulated gate bipolar transistor 401 and one fast recovery diode 402. In each of the IGBT modules 411 of the first horizontal section 412, the fast recovery diode 402 is located on an upper side of the insulated gate bipolar transistor 401. In each of the IGBT modules 411 of the second horizontal section 413, the fast recovery diode 402 is located on a lower side of the insulated gate bipolar transistor 401. A collector and an emitter of the insulated gate bipolar transistor 401 are electrically connected to the high-voltage pins 110. Therefore, the combined use of the insulated gate bipolar transistor and the fast recovery diode can effectively reduce loss of state switch, and on the premise of no influence on heat dissipation, the arrangement of the fast recovery diode and the insulated gate bipolar transistor is conducive to achieving a more compact arrangement of various power devices in the highly integrated power module, higher integration level, and higher space utilization rate, which can reduce the area occupied by the highly integrated power module, facilitate uniform control over the reliability of the above-mentioned power devices, lower the cost, and optimize the wiring.

As shown in FIG. 3, the first control unit 420 can be arranged on an upper side of the second horizontal section 413 and located on a horizontal side of at least a part of the first horizontal section 412. The first control unit 420 is electrically connected to the low-voltage pin 120. Therefore, due to a relatively small current flowing through the first device unit, arranging the first device unit between the power factor correction element and the first control unit cannot only facilitate the heat dissipation of the PFC, but also reduce the influence of the high temperature of the PFC on the first control unit, prolonging the service life of the first control unit, and maintaining good control over the first device unit during a long period of use.

As shown in FIG. 3, the first control unit 420 can be arranged on the upper side of the second horizontal section 413 and located on a right side of the first horizontal section 412. As a result, the high temperature of the PFC has less impact on the first control unit, which is more conducive to prolonging the service life of the first control unit and allow the first control unit to maintain a higher operation efficiency during a long period of use.

As shown in FIG. 3, the blower inverter 500 can include a second device unit 510 and a second control unit 520. The second device unit 510 includes six reverse-conducting insulated gate bipolar transistors 511. A part of the six reverse-conducting insulated gate bipolar transistors 511 are linearly spaced apart from one another along the horizontal direction to form a third horizontal section 501; another part of the reverse-conducting insulated gate bipolar transistors 511 are linearly spaced apart from one another along the vertical direction to form a vertical section 502. The vertical section 502 is arranged on an upper side of the third horizontal section 501. The second control unit 520 is arranged on a horizontal side of at least a part of the vertical section 502. A collector and an emitter of each reverse-conducting insulated gate bipolar transistor 511 are electrically connected to the high-voltage pins 110, and the second control unit 520 is electrically connected to the low-voltage pin 120. Therefore, the structural arrangement of the blower inverter can make full use of space and improve the integration level of the highly integrated power module, and moreover, the heat generated by the power factor correction element has less impact on the second control unit, which can ensure high reliability of the power device. Moreover, the blower inverter generates less heat, and is arranged on an edge of the substrate to save space. According to the embodiment of the present disclosure, the low-voltage pin may be electrically connected to a drive signal control terminal, overcurrent protection, over-temperature protection, and fault output pins in the second control unit.

As shown in FIG. 3, the second control unit 520 can be arranged on a right side of the vertical section 502. Thus, the high temperature of the PFC has less impact on the second control unit, which is more conducive to prolonging a service life of the second control unit, allows the second control unit to maintain high operation efficiency during a long period of use, and simplifies circuit wiring.

Figure 4:
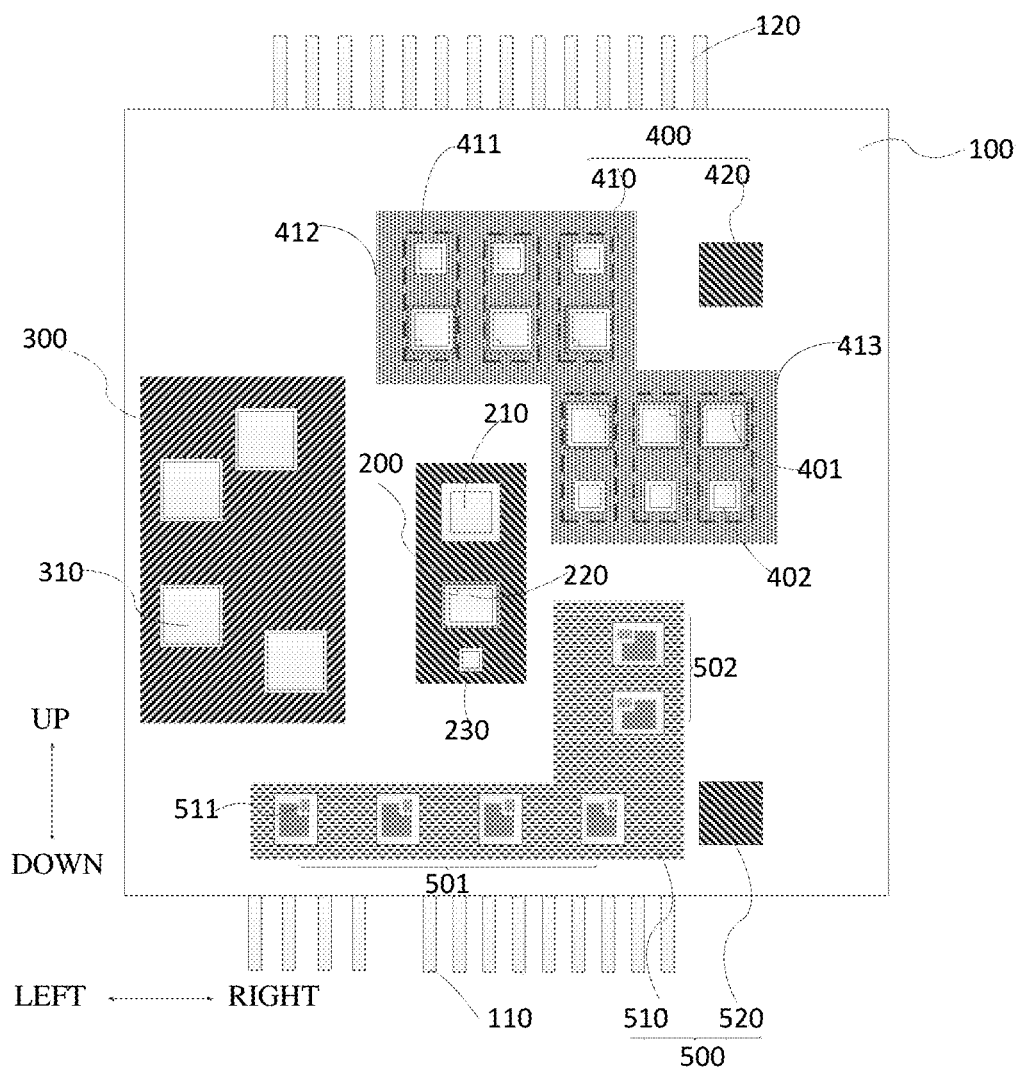
FIG. 4 is a schematic structural diagram showing additional elements of the highly integrated power module shown in FIG. 3.

As shown in FIG. 4, by means of the rectifier bridge 300, part of the current is output to a peripheral circuit (such as a switching power supply) through a pin, and another part of the current flows to the power factor correction element 200. Then, by means of the power factor correction element 200, part of the current flows to the IGBT modules 411 in the compressor inverter, and another part of the current flows to the IGBT modules 411 in the blower converter. The first control unit 420 controls the IGBT modules 411 in the first device unit 410 to turn on or off to change a compressor rotation frequency; the second control unit 520 controls the reverse-conducting insulated gate bipolar transistor 511 in the second device unit 510 to turn on or off to control a blower rotation frequency. Therefore, the current flows in the direction from left to right, which is consistent with the arrangement direction of the power devices, and hence is beneficial to simplification of circuit wiring.

Figure 5:
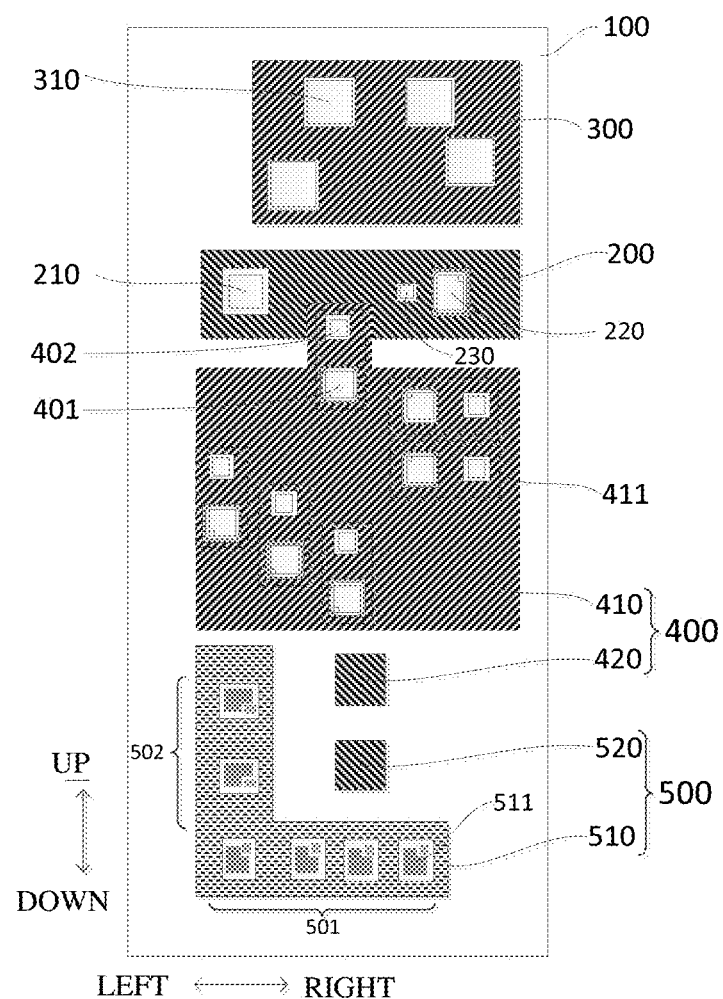
FIG. 5 is a schematic structural diagram of a highly integrated power module in another embodiment of the present disclosure.

As shown in FIG. 5, the highly integrated power module includes: a substrate 100; a rectifier bridge 300, a power factor correction element 200, a compressor inverter 400, and a blower inverter 500 arranged on the substrate 100. The rectifier bridge 300 is arranged on an upper side of the power factor correction element 200, the compressor inverter 400 is arranged on a lower side of the power factor correction element 200, and the blower inverter 500 is arranged on a lower side of the compressor inverter 400. The rectifier bridge 300 is electrically connected to the power factor correction element 200, and the power factor correction element 200 is electrically connected to the compressor inverter 400 and the blower inverter 500.

As shown in FIG. 5, the compressor inverter 400 can include a first device unit 410 and a first control unit 420 spaced apart from each other, and the first control unit 420 is arranged on a lower side of the first device unit 410. Thus, due to a relatively small current flowing through the first device unit 410, arranging the first device unit 410 between the power factor correction element 200 and the first control unit 420 cannot only facilitate the heat dissipation of the PFC, but also reduce the influence of the high temperature of the PFC on the first control unit 420, prolonging the service life of the first control unit 420, and maintaining good control over the first device unit during a long period of use.

As shown in FIG. 5, the first device unit 410 can include six insulated gate bipolar transistor (IGBT) modules 411, and each of the IGBT modules 411 includes one insulated gate bipolar transistor 401 and one fast recovery diode 402. At least one of the IGBT modules 411 is arranged vertically, and at least a part of the vertically arranged IGBT module 411 is arranged between two sub-elements in the power factor correction element 200. Therefore, without affecting the heat dissipation, the arrangement of the first device unit 410 and the PFC becomes more compact, which in turn makes the arrangement of the power devices in the highly integrated power module more compact, realizes higher integration level and space utilization rate, and reduces an area occupied by the highly integrated power module. Moreover, it is easier to uniformly control the reliability of the power devices, and the cost is lower.

As shown in FIG. 5, four IGBT modules 411 are vertically arranged, and the insulated gate bipolar transistor 401 is located on a lower side of the fast recovery diode 402 in each of the vertically arranged IGBT modules. In one of the vertically arranged IGBT modules 411, at least a part of the fast recovery diode 402 is arranged between the two sub-elements in the power factor correction element 200. Two IGBT modules 411 are arranged horizontally, and the fast recovery diode 402 is located on a right side of the insulated gate bipolar transistor 401 in each of the horizontally arranged IGBT modules 411. Therefore, the combined use of the insulated gate bipolar transistor 401 and the fast recovery diode 402 can effectively reduce loss of state switch, and on the premise of no influence on heat dissipation, arranging at least a part of the fast recovery diode 402 between the two sub-elements in the power factor correction element 200 is conducive to achieving a more compact arrangement of various power devices in the highly integrated power module, higher integration level, and higher space utilization rate, which can reduce the area occupied by the highly integrated power module, facilitate uniform control over the reliability of the power devices, and lower the cost.

According to the embodiments of the present disclosure, the type of the "two sub-elements" in "at least a part of the fast recovery diode 402 in one of the vertically arranged IGBT modules 411 being arranged between the two sub-elements of the power factor correction element 200" is not specifically limited. Referring to FIG. 5, at least a part of the fast recovery diode 402 in one of the vertically arranged IGBT modules 411 is arranged between a second diode 210 of the power factor correction element 200 and a fast recovery diode 230 of the power factor correction element. If positions of the fast recovery diode 230 of the power factor correction element and the insulated gate bipolar transistor 220 of the power factor correction element in FIG. 5 are interchanged, at least a part of the fast recovery diode 402 is arranged between the second diode 210 of the power factor correction element 200 and the insulated gate bipolar transistor 220 of the power factor correction element.

As shown in FIG. 5, the blower inverter 500 can include a second device unit 510 and a second control unit 520 spaced apart from each other. The second device unit 510 includes six reverse-conducting insulated gate bipolar transistors (RC-IGBT) 511. A part of the six reverse-conducting insulated gate bipolar transistors 511 are linearly spaced apart from one another along the horizontal direction to form a third horizontal section 501; another part of the reverse-conducting insulated gate bipolar transistors 511 are linearly spaced apart from one another along the vertical direction to form a vertical section 502. The vertical section 502 is arranged on an upper side of the third horizontal section 501. The second control unit 520 is arranged on an upper side of the third horizontal section 501 and located on a horizontal side of at least a part of the vertical section 502. Therefore, the structural arrangement of the blower inverter can make full use of space and improve the integration level of the highly integrated power module, and moreover, the heat generated by the power factor correction element has less impact on the second control unit, which can ensure high reliability of the power device.

As shown in FIG. 5, the first control unit 420 can be arranged on the horizontal side of at least a part of the vertical section 502 and located on an upper side of the second control unit 520. Therefore, the high temperature of the PFC has less impact on the first control unit 420 and the second control unit 520, which is beneficial to prolonging the service life of the first control unit and the second control unit and allows the first control unit and the second control to maintain high operation efficiency during a long period of use. Moreover, the arrangement of the first control unit on the upper side of the second control unit is beneficial to simplifying the circuit wiring.

As shown in FIG. 5, the first control unit 420 and the second control unit 520 can be located on a same side of the vertical section 502. As a result, the space utilization rate can be further improved to enhance the integration level of the highly integrated power module without affecting the heat dissipation. In some embodiments of the present disclosure, the first control unit 420 and the second control unit 520 are both arranged on a right side of the vertical section 502, realizing a better space-saving effect and a higher integration level of the highly integrated power module, and minimizing the effect of the high temperature of the PFC on the first control unit and the second control unit.

Figure 6:
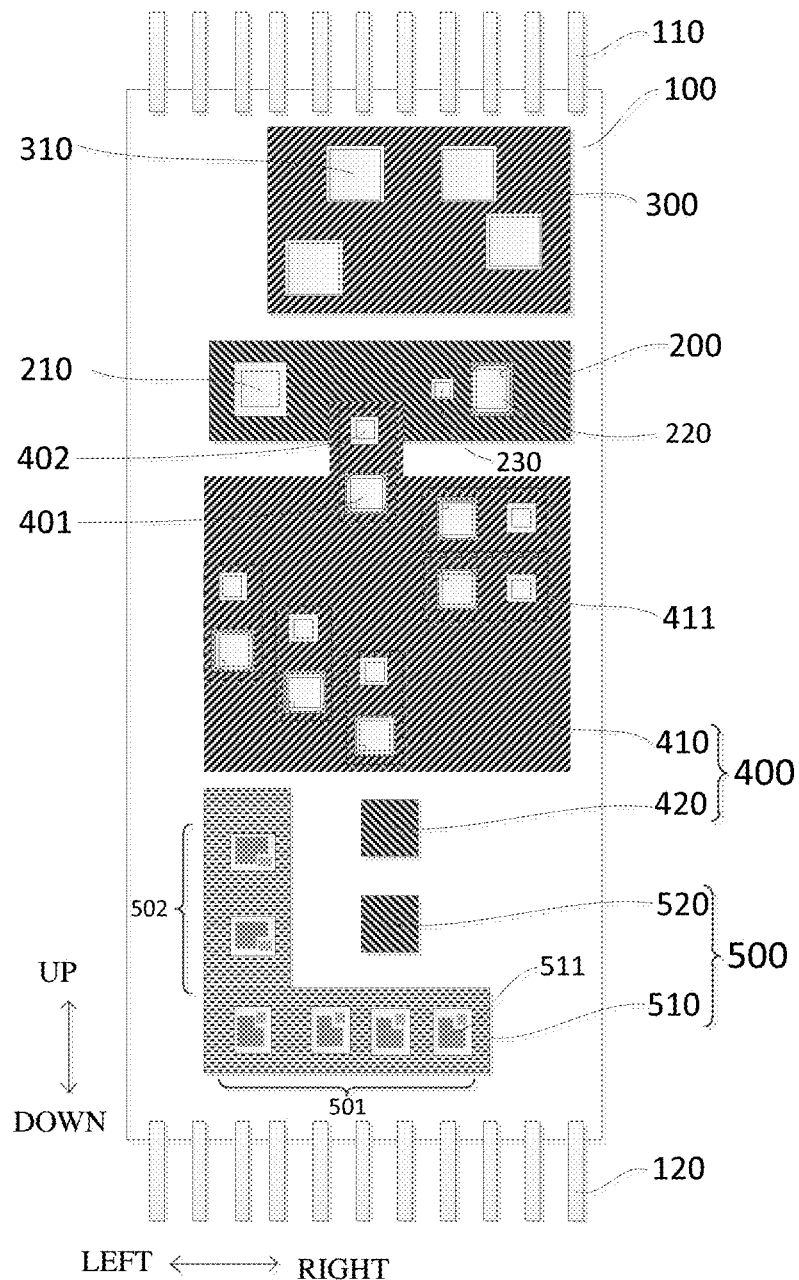
FIG. 6 is a schematic structural diagram showing additional elements of the highly integrated power module shown in FIG. 5.

According to the embodiment shown in FIGS. 5 and 6, by means of the rectifier bridge 300, part of the current is output to a peripheral circuit (such as a switch, a power supply and etc.) through a pin, and another part of the current flows to the power factor correction element 200. Then, by means of the power factor correction element 200, part of the current flows to the IGBT module 411 in the first device unit 410, and another part of the current flows to the reverse-conducting insulated gate bipolar transistor 511 in the second device unit 510. Therefore, the current flows from a left side to a right side of the highly integrated power module, which is consistent with the arrangement direction of the power devices, and hence is beneficial to simplification of circuit wiring.

Figure 7:
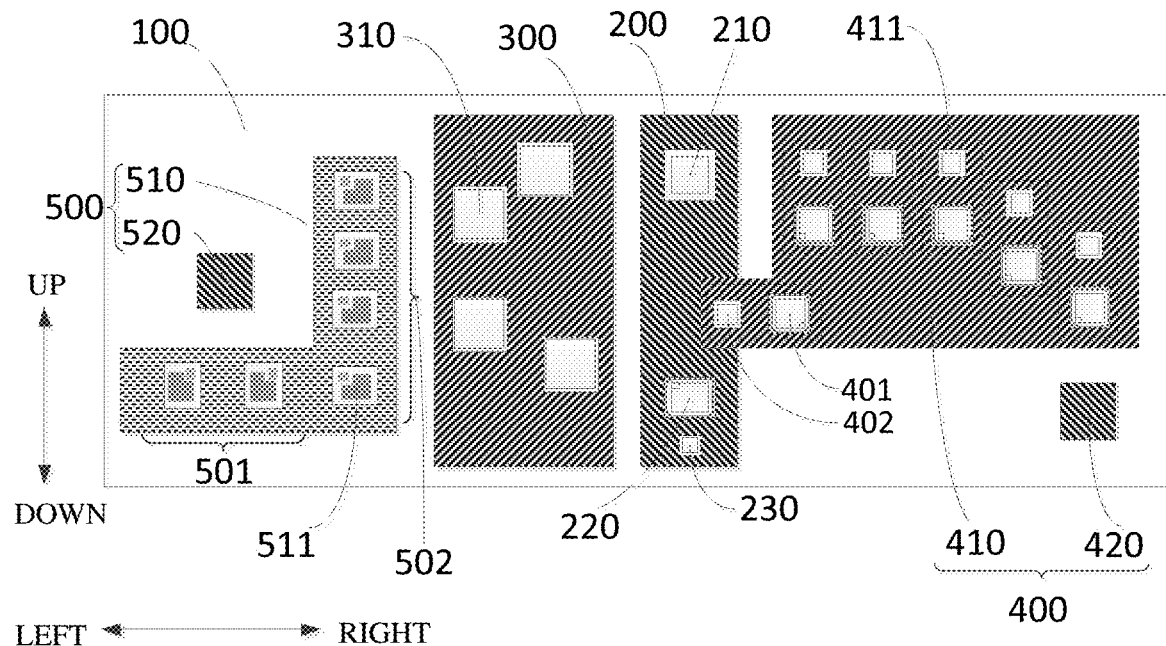
FIG. 7 is a schematic structural diagram of a highly integrated power module in another embodiment of the present disclosure.

According to another embodiment shown in FIG. 7, the highly integrated power module can include: a substrate 100; a blower inverter 500, a rectifier bridge 300, a power factor correction element 200, and a compressor inverter 400 arranged on the substrate 100. The rectifier bridge 300 is arranged on a left side of the power factor correction element 200, the compressor inverter 400 is arranged on a right side of the power factor correction element 200, and the blower inverter 500 is arranged on a left side of the rectifier bridge 300. The rectifier bridge 300 is electrically connected to the power factor correction element 200, and the power factor correction element 200 is electrically connected to the compressor inverter 400 and the blower inverter 500.

As shown in FIG. 7, the compressor inverter 400 can include a first device unit 410 and a first control unit 420 spaced apart from each other, and the first control unit 420 is arranged on a lower side of the first device unit 410 close to a right edge. Thus, due to a relatively small current flowing through the first device unit 410, arranging the first control unit 420 on the lower side of the first device unit 410 close to the right edge cannot only facilitate the heat dissipation of the PFC, but also reduce the influence of the high temperature of the PFC on the first control unit 420, minimizing interference in the first control unit 420, prolonging the service life of the first control unit 420, and maintaining good control over the first device unit 410 during a long period of use.

As shown in FIG. 7, the first device unit 410 can include six insulated gate bipolar transistor (IGBT) modules 411, and each of the IGBT modules 411 includes one insulated gate bipolar transistor 401 and one fast recovery diode 402. At least one of the IGBT modules 411 is arranged horizontally, and at least a part of the horizontally arranged IGBT module 411 is arranged between two sub-elements in the power factor correction element 200. Therefore, without affecting the heat dissipation, the arrangement of the first device unit 410 and the PFC becomes more compact, which in turn makes the arrangement of the power devices in the highly integrated power module more compact, realizes higher integration level and space utilization rate, and reduces an area occupied by the highly integrated power module. Moreover, it is easier to uniformly control the reliability of the power devices, and the cost is lower.

As shown in FIG. 7, one IGBT module 411 is arranged horizontally. In the horizontally arranged IGBT module 411, the insulated gate bipolar transistor 401 is located on a right side of the fast recovery diode 402, and at least a part of the fast recovery diode 402 is arranged between the two sub-elements in the power factor correction element 200. Five IGBT modules 411 are arranged vertically, and the fast recovery diode 402 is located on an upper side of the insulated gate bipolar transistor 401 in each vertically arranged IGBT module 411. Therefore, the combined use of the insulated gate bipolar transistor 401 and the fast recovery diode 402 can effectively reduce loss of state switch, and on the premise of no influence on heat dissipation, arranging at least a part of the fast recovery diode 402 between the two sub-elements in the power factor correction element 200 is conducive to achieving a more compact arrangement of various power devices in the highly integrated power module, higher integration level, and higher space utilization rate, which can reduce the area occupied by the highly integrated power module, facilitate uniform control over the reliability of the power devices, and lower the cost.

According to the embodiment of the present disclosure, the type of the "two sub-elements" in "at least a part of the fast recovery diode 402 in one of the vertically arranged IGBT modules 411 being arranged between the two sub-elements of the power factor correction element 200" is not specifically limited. Referring to FIG. 7, at least a part of the fast recovery diode 402 in one of the vertically arranged IGBT modules 411 is arranged between a second diode 210 of the power factor correction element 200 and the insulated gate bipolar transistor 220 of the power factor correction element. If positions of the fast recovery diode 230 of the power factor correction element and the insulated gate bipolar transistor 220 of the power factor correction element in FIG. 7 are interchanged, at least a part of the fast recovery diode 402 in one of the vertically arranged IGBT modules 411 is arranged between the second diode 210 of the power factor correction element 200 and the fast recovery diode 230 of the power factor correction element.

As shown in FIG. 7, the blower inverter 500 can include a second device unit 510 and a second control unit 520 spaced apart from each other. The second device unit 510 includes six reverse-conducting insulated gate bipolar transistors (RC-IGBT) 511. A part of the six reverse-conducting insulated gate bipolar transistors 511 are linearly spaced apart from one another along the horizontal direction to form a third horizontal section 501; another part of the reverse-conducting insulated gate bipolar transistors 511 are linearly spaced apart from one another along the vertical direction to form a vertical section 502. The vertical section 502 is arranged on a right side of the third horizontal section 501. The second control unit 520 is arranged on a left side of the vertical section 502 and located on a vertical side of at least a part of the third horizontal section 501. Therefore, the structural arrangement of the blower inverter can make full use of space and improve the integration level of the highly integrated power module. Moreover, the arrangement of the second control unit 520 on a left edge can minimizing interference of the PFC with the first control unit 420, prolonging the service life of the second control unit 520, and maintaining good control over the second device unit during a long period of use.

As shown in FIG. 7, the second control unit 520 is arranged right above at least a part of the third horizontal section 501 and right on a left side of at least a part of the vertical section 502. Therefore, the space utilization rate and the integration level of the highly integrated power module can be enhanced without affecting the heat dissipation. Moreover, the arrangement of the second control unit 520 at the edge can minimize interference of the PFC with the second control unit.

According to an embodiment of the present disclosure, shown in FIG. 8, the second control unit 520 can be arranged right below at least a part of the third horizontal section 501 and right on a left side of at least a part of the vertical section 502. Therefore, the space utilization rate and the integration level of the highly integrated power module can be enhanced without affecting the heat dissipation. Moreover, the arrangement of the second control unit 520 at the edge can minimize interference of the PFC with the second control unit.

According to certain embodiments of the present disclosure, as shown in FIGS. 2, 4, 6 and 9, the highly integrated power module can further include: high-voltage pins 110 arranged on a first edge of the substrate 100; and low-voltage pins 120 arranged on a second edge of the substrate 100. As a result, the above-mentioned power devices can be effectively driven, and signals generated in the power devices can be transmitted effectively in time, so that the highly integrated power module can operate efficiently. According to the embodiment of the present disclosure, the high-voltage pins are electrically connected to an input terminal of the rectifier bridge, an output terminal of the rectifier bridge, an output terminal of the power factor correction element, a collector and an emitter of the insulated gate bipolar transistor of the compressor inverter, and a collector and an emitter of the reverse-conducting insulated gate bipolar transistor of the blower inverter; the low-voltage pins are electrically connected to a first control unit of the compressor and a second control unit of the blower. As a result, the circuit wiring is relatively simple, and the current flow path is relatively short, which is beneficial to reducing heat generation and lowering the temperature in the highly integrated power module. Thus, the yield and operation efficiency of the power devices can be improved, and the service life thereof can be extended. According to the embodiment of the present disclosure, the low-voltage pins may also be electrically connected to a drive signal control terminal, overcurrent protection, over-temperature protection, and fault output pins in the second control unit.

Figure 8:
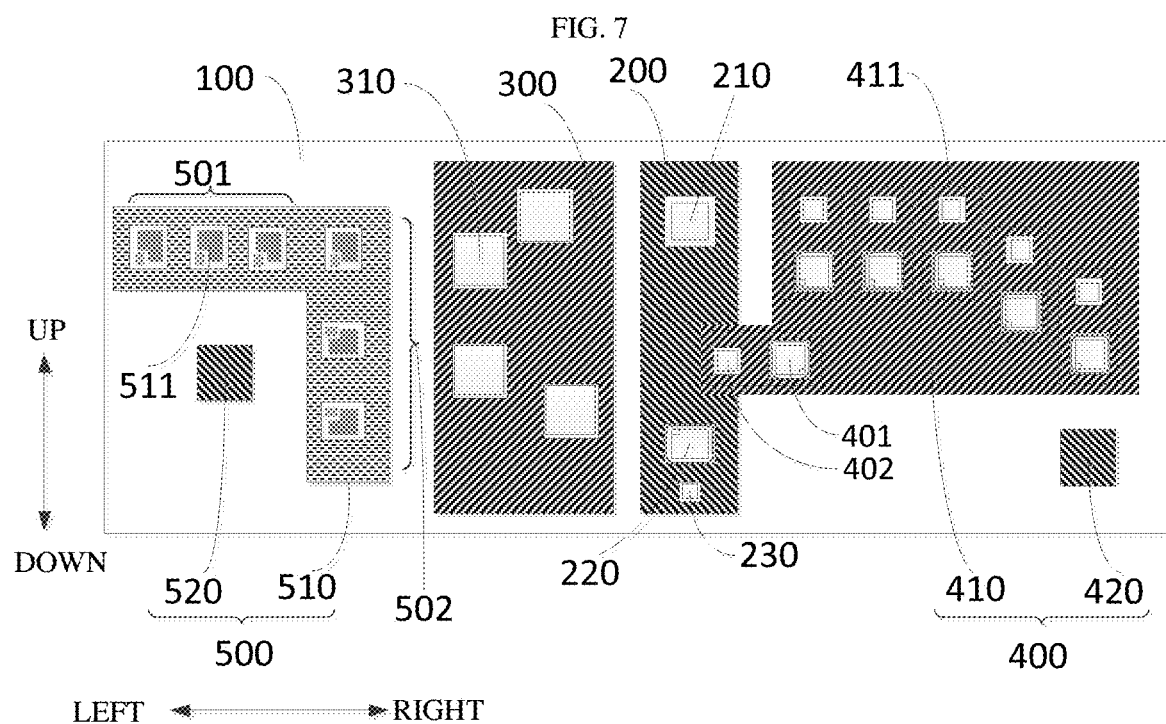
FIG. 8 is a schematic structural diagram of a highly integrated power module in yet another embodiment of the present disclosure.
Figure 9:
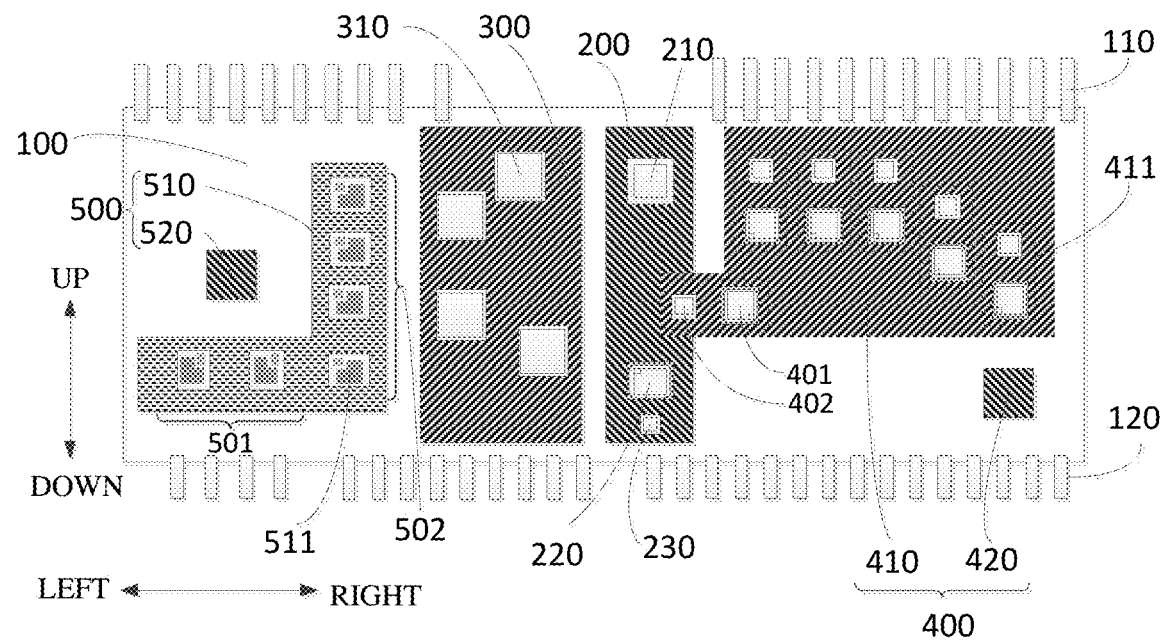
FIG. 9 is a schematic structural diagram showing additional elements of the highly integrated power module shown in FIG. 7 or FIG. 8.

According to the embodiments of the present disclosure, shown in FIGS. 7 to 9, by means of the rectifier bridge 300, part of the current is output to a peripheral circuit (such as a switch, a power supply and etc.) through a pin, and another part of the current flows to the power factor correction element 200. Then, by means of the power factor correction element 200, part of the current flows to the IGBT module 411 in the first device unit 410, and another part of the current flows to the reverse-conducting insulated gate bipolar transistor 511 in the second device unit 510. Therefore, the current flows from a left side to a right side of the highly integrated power module, which is consistent with the arrangement direction of the power devices, and hence is beneficial to simplification of circuit wiring.

The substrate 100 can be made of materials with high thermal conductivity, such as aluminum and ceramics, facilitating export of heat generated by the power devices (including the power factor correction element 200, the rectifier bridge 300, the compressor inverter 400, and the blower inverter 500) and improving the heat dissipation efficiency. An insulating layer, a copper foil trace, a green oil layer, a device bonding pad and the like may also be arranged between the substrate 100 and the power devices, thereby ensuring normal operation of the power devices.

As shown in FIGS. 1 to 9, the rectifier bridge 300 can include four first diodes 310 arranged at intervals, and the rectifier bridge 300 can effectively convert alternating current to direct current to meet subsequent requirements of the power devices. According to the embodiment of the present disclosure, a material forming the first diodes 310 includes semiconductor germanium, silicon, and the like, so that the performance of the diodes is excellent.

As shown in FIGS. 1 to 9, the power factor correction element 200 can include three sub-elements arranged at intervals from up to down, namely, a second diode 210, an insulated gate bipolar transistor 220, and a fast recovery diode 230 of the power factor correction element. As a result, an area occupied by the power factor correction element can be effectively reduced, and its operation efficiency is high.

According to an embodiment of the present disclosure, the first control unit may be a high voltage integrated circuit (HVIC) that controls six IGBT modules in the first device unit and the insulated gate bipolar transistor 220 of the power factor correction element. Specifically, any three of the six IGBT modules in the first device unit are set as upper-arm IGBT modules, and the other three thereof are set as lower-arm IGBT modules. The high voltage integrated circuit realize adjustment for the compressor rotation frequency through control over the upper-arm IGBT modules and the lower-arm IGBT modules. As a result, the operation efficiency is improved, and the power consumption is lowered.

According to an embodiment of the present disclosure, the second control unit may be a high voltage integrated circuit (HVIC) that controls six reverse-conducting insulated gate bipolar transistors in the second control unit. Specifically, any three of the six reverse-conducting insulated gate bipolar transistors are set as upper-arm reverse-conducting insulated gate bipolar transistors, and the other three thereof are set as lower-arm reverse-conducting insulated gate bipolar transistors. The high voltage integrated circuit realize adjustment for the blower rotation frequency through control over the upper-arm reverse-conducting insulated gate bipolar transistors and the lower-arm reverse-conducting insulated gate bipolar transistors. As a result, the operation efficiency is improved, and the power consumption is lowered.

According to an embodiment of the present disclosure, the highly integrated power module further includes at least one type of connecting wires, resistor elements, and capacitor elements. The connecting wires, the resistor elements, and the capacitor elements are arranged in a vacant region on the substrate. As a result, the space of the vacant region can be fully utilized, the integration level and reliability of the highly integrated power module can be improved, the cost can be lowered, and the volume of the electronic control can be reduced. It should be noted that the vacant region refers to a region that is not covered by power devices.

According to the embodiments of the present disclosure, after the power devices, connecting wires, resistor elements, and capacitor elements are installed in the above-mentioned arrangement, they are packaged in a same housing to achieve a highly integrated power module with a high integration level, small occupation area, and high heat dissipation efficiency. The highly integrated power module can uniformly control the reliability of power devices, and have little difficulty in development and maintenance and low cost.

In another aspect, the present disclosure provides an electrical appliance. According to embodiments of the present disclosure, the electrical appliance includes the highly integrated power module described above. The electrical appliance has better heat dissipation effect, longer service life, better performance over a long period of use, and lower cost.

According to the embodiments of the present disclosure, the electrical appliance may be an air conditioner, and the air conditioner may include a blower, a compressor, a heat exchanger, a throttle assembly, a wind guide component, a chassis, a panel and other structures or components necessary for conventional air conditioners, which will not be elaborated here. According to the embodiments of the present disclosure, the air conditioner may be a wall air conditioner, a cabinet air conditioner, and the like.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicate with each other; may also be direct connections or indirect connections via intervening structures; may also be inner communication or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. Moreover, those skilled in the art can integrate and combine the different embodiments or examples and the features of the different embodiments or examples described in this specification without contradicting each other.

Although embodiments of the present disclosure have been shown and described, it can be appreciated by those skilled in the art that the above embodiments are merely exemplary and are not intended to limit the present disclosure, and various changes, modifications, alternatives and variations may be made in the embodiments within the scope of the present disclosure.

What is claimed is:

1. An integrated power module comprising:
   a substrate; and
   a power factor correction element, a rectifier bridge, a compressor inverter, and a blower inverter arranged on the substrate,
   wherein the rectifier bridge is arranged on a left side of the power factor correction element, the compressor inverter is arranged on an upper side of the power factor correction element, and the blower inverter is arranged on a lower side of the compressor inverter,
   wherein the rectifier bridge is electrically connected to the power factor correction element, and the power factor correction element is electrically connected to the compressor inverter and the blower inverter,
   wherein the compressor inverter comprises a first device unit and a first control unit spaced apart from each other, and the first device unit comprises a first horizontal section and a second horizontal section connected to each other,
   wherein the first horizontal section is arranged on the upper side of the power factor correction element, and at least a part of the second horizontal section is arranged on a right side of the power factor correction element, and
   wherein the first control unit is arranged on an upper side of the second horizontal section and located on a horizontal side of at least a part of the first horizontal section.

2. The integrated power module according to claim 1, wherein:
   each of the first horizontal section and the second horizontal section comprises three IGBT modules arranged vertically, and each of the IGBT modules comprises one insulated gate bipolar transistor and one fast recovery diode;
   in each of the IGBT modules of the first horizontal section, the fast recovery diode is located on an upper side of the insulated gate bipolar transistor; and
   in each of the IGBT modules of the second horizontal section, the fast recovery diode is located on a lower side of the insulated gate bipolar transistor.

3. The integrated power module according to claim 1, wherein:
   the blower inverter comprises a second device unit and a second control unit;
   the second device unit comprises six reverse-conducting insulated gate bipolar transistors;
   a part of the six reverse-conducting insulated gate bipolar transistors are linearly spaced apart from one another along a horizontal direction to form a third horizontal section, and another part of the reverse-conducting insulated gate bipolar transistors are linearly spaced apart from one another along a vertical direction to form a vertical section, wherein the vertical section is arranged on an upper side of the third horizontal section; and
   the second control unit is arranged on a horizontal side of at least a part of the vertical section.

4. The integrated power module according to claim 3, wherein the second control unit is arranged on a right side of the vertical section.

5. The integrated power module according to claim 3, wherein the first control unit is arranged on the upper side of the second horizontal section and located on a right side of the first horizontal section.

6. The integrated power module according to claim 3, further comprising:
high-voltage pins arranged on a first edge of the substrate, and electrically connected to an input terminal of the rectifier bridge, an output terminal of the rectifier bridge, an output terminal of the power factor correction element, a collector and an emitter of the insulated gate bipolar transistor of the compressor inverter, and a collector and an emitter of the reverse-conducting insulated gate bipolar transistor of the blower inverter; and
low-voltage pins arranged on a second edge of the substrate, and electrically connected to the first control unit and the second control unit.

7. The integrated power module according to claim 1, further comprising at least one type of connecting wires, resistor elements, and capacitor elements, wherein the connecting wires, the resistor elements, and the capacitor elements are arranged in a vacant region on the substrate.

8. An air conditioner comprising the integrated power module according to claim 1.

9. An integrated power module comprising:
a substrate; and
a power factor correction element, a rectifier bridge, a compressor inverter, and a blower inverter arranged on the substrate,
wherein the rectifier bridge is arranged on an upper side of the power factor correction element, the compressor inverter is arranged on a lower side of the power factor correction element, and the blower inverter is arranged on a lower side of the compressor inverter,
wherein the rectifier bridge is electrically connected to the power factor correction element, and the power factor correction element is electrically connected to the compressor inverter and the blower inverter,
wherein the compressor inverter comprises a third device unit and a third control unit spaced apart from each other, and the third control unit is arranged on a lower side of the third device unit,
wherein:
the third device unit comprises six IGBT modules, and each of the IGBT modules comprises one insulated gate bipolar transistor and one fast recovery diode; and
at least one of the IGBT modules is arranged vertically, and at least a part of the vertically arranged IGBT module is arranged between two sub-elements of the power factor correction element, wherein:
four of the IGBT modules are vertically arranged, wherein the insulated gate bipolar transistor is located on a lower side of the fast recovery diode in each of the vertically arranged IGBT modules, wherein in one of the vertically arranged IGBT modules, at least a part of the fast recovery diode is arranged between the two sub-elements in the power factor correction element; and
two of the IGBT modules are arranged horizontally, wherein the fast recovery diode is located on a right side of the insulated gate bipolar transistor in each of the horizontally arranged IGBT modules, and
wherein:
the blower inverter comprises a fourth device unit and a fourth control unit;
the fourth device unit comprises six reverse-conducting insulated gate bipolar transistors;
a part of the six reverse-conducting insulated gate bipolar transistors are linearly spaced apart from one another along a horizontal direction to form a horizontal section, and another part of the reverse-conducting insulated gate bipolar transistors are linearly spaced apart from one another along a vertical direction to form a vertical section, wherein the vertical section is arranged on an upper side of the horizontal section; and
the fourth control unit is arranged on the upper side of the horizontal section and located on a horizontal side of at least a part of the vertical section.

10. The integrated power module according to claim 9, wherein the third control unit is arranged on a horizontal side of at least a part of the vertical section and located on an upper side of the fourth control unit.

11. The integrated power module according to claim 9, wherein the third control unit and the fourth control unit are located on a same side of the vertical section.

12. The integrated power module according to claim 9, further comprising:
high-voltage pins arranged on a first edge of the substrate, and electrically connected to an input terminal of the rectifier bridge, an output terminal of the rectifier bridge, an output terminal of the power factor correction element, a collector and an emitter of the insulated gate bipolar transistor of the compressor inverter, and a collector and an emitter of the reverse-conducting insulated gate bipolar transistor of the blower inverter; and
low-voltage pins arranged on a second edge of the substrate, and electrically connected to the third control unit and the fourth control unit.

* * * * *